United States Patent [19]

Blum

[11] Patent Number: 4,507,733
[45] Date of Patent: Mar. 26, 1985

[54] PHOTON EMISSION IMAGING APPARATUS AND METHOD

[76] Inventor: Alvin S. Blum, 2350 Del Mar Pl., Fort Lauderdale, Fla. 33301

[21] Appl. No.: 394,898

[22] Filed: Jul. 6, 1982

Related U.S. Application Data

[63] Continuation-in-part of Ser. No. 173,962, Jul. 31, 1980.

[51] Int. Cl.³ ............................................... G01T 1/20
[52] U.S. Cl. .................................. 364/414; 364/571; 378/7; 250/363 R
[58] Field of Search ....................... 364/414, 518, 571; 250/252.1, 363 R, 363 S; 378/7; 382/41

[56] References Cited

U.S. PATENT DOCUMENTS

| | | | |
|---|---|---|---|
| 3,878,373 | 4/1975 | Blum | 364/414 |
| 4,096,389 | 6/1978 | Ashe et al. | 378/7 |
| 4,179,607 | 12/1979 | Lange et al. | 364/414 |
| 4,223,221 | 9/1980 | Gambini et al. | 250/363 S |
| 4,223,388 | 9/1980 | Nishikawa et al. | 364/571 |
| 4,228,515 | 10/1980 | Genna et al. | 364/414 |
| 4,298,944 | 11/1981 | Stoub et al. | 250/363 S |
| 4,336,458 | 6/1982 | Krumme et al. | 378/7 |

Primary Examiner—Gary Chin
Attorney, Agent, or Firm—Alvin S. Blum

[57] ABSTRACT

System for imaging the distribution of radiation from a distributed radiation source including a scintillator, and photodetectors viewing the scintillator. System enhances image quality by rejecting off-axis radiation passing through collimator holes which degrade image resolution when source is away from collimator surface.

19 Claims, 7 Drawing Figures

PHOTON EMISSION IMAGING APPARATUS AND METHOD

This is a continuation in part of copending application Ser. No. 06/173,962, filed 7/31/80.

BACKGROUND OF THE INVENTION

1. Field of the invention.

This invention relates to radiation detection and imaging devices and methods for locating each of a plurality of photon emitting sources, and more particularly to instrumentation for surveying the disposition of a distributed radiation source such as a radioactive pharmaceutical in the human body and displaying a more accurate image of said distribution.

2. Description of the prior art.

Tobias U.S. Pat. No. 2,779,876 provides photodetectors disposed adjacent a scintillator for locating the image point in the scintillator after photon emission by determining which phototube provides a responsive signal. Anger U.S. Pat. No. 3,011,057 improved resolution to an area smaller than a phototube by spacing the phototubes a moderate distance from the scintillator so that several phototubes may report each light flash. The electrical signals from the phototubes are combined in a coordinate system relative to their positions over the scintillator and report the approximate location of the scintillation in the crystal but not the location of the radiation source. Blum U.S. Pat. No. 3,878,373 provides locating of the radiation source in the image by comparing the phototube signal pattern caused by the scintillation from the source in unknown location with signal patterns generated when sources are in known locations.

SUMMARY OF THE PRESENT INVENTION

Photon emission imaging apparatus responsive to individual radiation stimuli includes a collimator, at least one scintillator in the path of radiation emissions from a distributed radiation source, a plurality of photodetectors for viewing each scintillator, and signal processor, storage apparatus and data processor interconnected with one another and connected to the photodetectors. A display is connected to the data processor to provide an improved image of the distribution of the sources. A calibration system is used to provide the device with radiation emission response data and location data from radiation emissions at a plurality of known locations for use by the data processor to derive more accurately the location of each of a plurality of distributed radiation emitting sources of unknown location in a body. The calibration system may include a sheet of uniformly distributed radioactive material and apparatus for applying this to the outer face of the collimator. The collimator is a radiation opaque plate with holes therethrough. Apparatus for moving the sheet source during calibration data acquisition so as to average out any lack of uniformity in the source may also be provided. Each photon of radiation which passes through a collimator hole and is absorbed by the scintillator crystal emits a light flash seen by the phototubes. Each phototube responds with an electrical pulse proportional to the amount of light it sees. The sum of these (intergral pulse height) may be recorded. It will be generally proportional to the incident photon energy and may be used to select only certain photon energies for improved imaging. The pattern of the individual phototube pulse amplitudes (signal pattern) will be indicative of the approximate center of light resulting from the incident photon and the particular collimator hole through which it passed. It is further indirectly assumed that the source of that photon is located somewhere in the body above that collimator hole. It is an object of the invention to provide an improved calibration system for storing radiation response data and integral pulse heights together with known radiation source locations for comparison with unknown radiation response data. It is an object of the invention to provide a system to more accurately locate the radiation emitting source to improve image resolution.

Scintillation cameras in clinical use have adequate intrinsic resolution, i.e. resolution of sources right at the face of the scintillation crystal. Their greatest weakness is in poor system resolution and poor image quality with the collimator in place and the source deep within the body of the patient and a considerable distance from the collimator face. It is an object of the invention to overcome this weakness.

In the usual case of a lead collimator having parallel holes perpendicular to the crystal face, only photons traveling in a direction perpendicular to the crystal face can pass through the collimator holes without being stopped by lead septa. If the collimator were completely efficient, only exactly perpendicular rays would strike the crystal. The distribution of scintillations within the crystal would be a true planar projection of the distribution of photon emitter within the subject. The measured radiation (sensitivity) would approximately follow the inverse square law and resolution would deteriorate only slowly with increased distance from the collimator. With real collimators, sensitivity remains relatively unchanged with distance and resolution deteriorates rapidly with distance. Both effects have a common cause. The number of "true" (i.e. perpendicular) rays reaching the crystal through collimator holes falls as the source is moved away from the collimator face and the number of "false" (i.e. non perpendicular) rays reaching the crystal through collimator holes increases. Consider a point source on the axis of a collimator hole at the surface of the collimator. Rays from that source which reach the crystal through that hole subtend a certain solid angle; these may be considered "true" rays. As the source moves a distance along the axis away from the collimator, the solid angle gets smaller and the inverse square law holds. However, as the distance increases, more rays from the source can pass through adjacent holes. Because these add to the other rays, the total rays striking the crystal (sensitivity) is increased and the inverse square law no longer holds. These are "false" rays since they misrepresent the location of the source. And the more distant the collimator hole they pass through, the more they degrade system resolution. Septal penetration contributes further to this image degradation. It is an object of the invention to provide apparatus, a calibration system, and data processor to discard certain of these false rays from the imaging process to improve image quality. When sensitivity is desired over resolution these rays can be included in the image and when resolution is desired over sensitivity they can be excluded from the image. Most of the true rays tend to strike the crystal in a region directly beneath the collimator hole and more are central than peripheral. Whereas, many of the false rays strike the crystal under the septum or at the periphery of the collimator hole. This distinction can be accentuated by spacing the collimator away from the crystal an optimum distance which will be related to collimator geometry. Collimator geometry can also be optimized to accentuate this distinction such as by using thicker septa, and larger and fewer holes than are often employed.

It is an object of the invention to improve image resolution by selectively discarding certain off axis radiation striking the detector peripheral to the collimator holes.

Calibration requires the selective storage of radiation response data such as pulse height and radiation response data from source material in known locations such as over the center of collimator holes. In one calibration embodiment at least one small source is moved to the center of each collimator hole in turn and radiation emission response data are acquired together with source location information. In another embodiment a mosaic of sources having a point source corresponding to every collimator hole location is positioned over the collimator so that the sources and the center of the collimator holes are in registry. This mosaic may be prepared by a photolithographic process from the collimator itself.

In another calibration embodiment, a uniformly distributed sheet source of radioactive material is applied to the collimator face while radiation emission response data are acquired. Each signal pattern is related to source material over a particular collimator hole by a data process so that the effect is similar to an individual source centered over each collimator hole. Many of the responses may be discarded as not being representative of source over a hole.

The complete pattern, pulse height and source location for every calibration scintillation may be stored in a calibration memory. Unknown signal patterns may be compared with every calibration pattern. Since a single image may involve processing a million scintillation events, a million unknown signal patterns must be located in the image by comparison with the calibration patterns for each of the thousands of collimator holes. Without some simplification this presents an enormous data processing task which must be performed in a short time. The instant invention facilitates this task by providing processes which: reduce the size of each of the unknown signal patterns; reduce the size of each of the calibration patterns, reduce the number of calibration patterns with which each unknown pattern must be compared; and improve resolution so that an improved image can be developed rapidly to satisfy the time element of clinical requirements. Those calibration patterns least representative of acceptable source locations may be determined by their frequency of occurrence and discarded. This would be the case with Compton events within the crystal. Each pattern may be reduced in size by a sorting process to discard individual signals from detectors remote from the scintillation by comparing signal amplitudes and discarding the smaller ones. Thereby 64 tube patterns may be reduced to 6 tube patterns, for example. At the same time, the signals may be ordered by size. The resulting processed pattern now represents only the phototubes proximal to the radiation and the signals are listed in descending order of signal amplitude. The sorted and ordered calibration patterns together with their pulse height value and collimator hole location are arranged in calibration memory wherein the address in memory is related to the order of the pattern. The address may also be related to the amplitude of certain signals. This process reduces the number of calibration patterns which must be searched or compared to an unknown pattern to find a location for the unknown source. By sorting and ordering the unknown pattern prior to matching, fewer signals make up the pattern and only the patterns in the calibration memory at that address have a similar order and magnitude that need to be compared for matching and thereby possibly locating the source of the unknown radiation. Relative amplitudes rather than absolute amplitudes may be used by dividing each signal by the sum of signals. This overcomes some variations in efficiency of conversion from photon energy to photodetector signals.

In another embodiment of the invention, the data processing task may be further simplified by reducing the signal pattern to an X and Y position value by electronic methods well known in the art such as the method of Anger.

In another embodiment of the invention, radiation events striking the crystal at the periphery of collimator holes are rejected not by a computer comparison process operant on detected signals, but they are rejected because they fail to generate signals since those regions of the crystal are composed of a material unresponsive to radiation.

It is an object of the invention in its broadest aspect to provide imaging apparatus and method capable of the maximum utilization of the radiation from the patient for supplying diagnostic images. For complying with these and other objects, the camera of the invention has a number of particular features which should preferably be employed in combination although each of them is useful separately without departure from the scope of the invention.

DESCRIPTION OF PREFERRED EMBODIMENTS OF THE INVENTION

Figure 1:
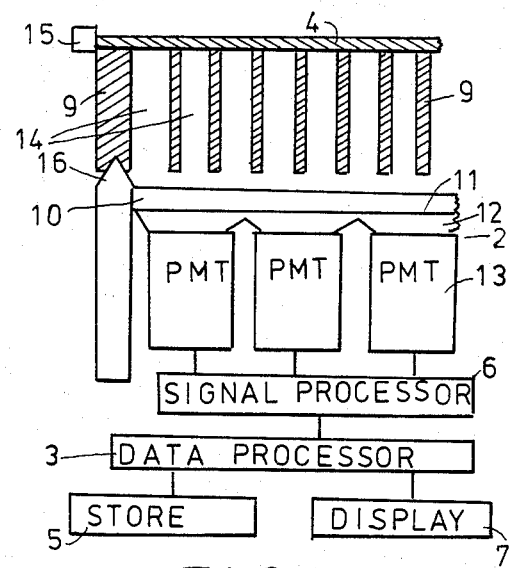
FIG. 1 shows a photon imaging apparatus.

FIG. 1 shows photon imaging apparatus of the invention including a photon detector 2 for detecting radiation emissions, interconnected signal processor 6 for processing electrical signals from detector 2 and data processor 3 that may be a computer device for collecting, storing, analyzing and displaying radiation response data and radiation source location and image data. A calibration source 4 is used in conjunction with photon detector 2 to provide radiation emission response data from known locations to data processor 3. The response data from a plurality of known locations together with the location data from each location is processed through data processor 3 to storage apparatus 5. The stored data is later used by processor 3 to compare with response data from an unknown source in an unknown location for determination of its location. When the unknown response data is compared with response data from many known locations, the stored location data from acceptably matching stored response data identifies the location of the unknown source. That location data from a plurality of unknown sources may be used by the data processor in a repetitive process to build up an image in image display 7 of the distribution of radiation emitting material in a distributed radiation source such as a radioactive tracer in a patient in front of collimator 9. The photon detector 2 includes a collimator 9, a large area, thin, scintillation crystal 10, having transparent window 11, optional shaped light pipe 12, a plurality of photomultiplier tubes (PMT) 13. Calibration source 4 is a uniformly distributed thin layer of radioactive material applied to the surface of lead collimator 9 having parallel holes 14 therethrough. Most individual photons from the source pass through holes 14 and impinge upon crystal 10, producing radiation response data which are processed and then stored in storage apparatus 5.

Calibration method for locating the source of a photon producing characteristic radiation response data such as PMT signal patterns and total pulse height when the source is part of a uniformly distributed source:

The real physical location of each hole 14 in collimator 9 is either provided by the manufacturing process or determined by means such as optical scanning. This real hole location data is fed into data store 5. Absent damage, these data should not change. Collimator position fixing tapered pin system 16 of peripherally located pins establishes reproducible collimator position relative to detector 2 so that collimators may be changed without requiring recalibration. Many calibration responses (e.g. a million) are stored with uniform sheet source 4 in place. Moving apparatus 15 may be provided to move source 4 in its plane to average out any non uniformities in the source, using well known mechanisms such as those employed in orbital sanders. A first approximate X,Y location is assigned to each response by application of common positioning methods such as the Anger method which assigns a location in the X direction by adding fixed fractions of all PMT signals wherein the fractions are determined by the X location of each PMT. The location in the Y direction is assigned by adding fixed fractions of all PMT signals, wherein the fractions are determined by the Y location of each PMT. This process may be analog or digital. An image built up of these million location points would display a hot spot or concentration of points for each collimator hole separated by colder areas corresponding to regions of the crystal shielded by the lead septa. Because of all the distortions and approximations in the process, the hot spots will not be spaced uniformly nor located accurately at collimator holes and there will not be sharp separation of holes and septa. The X, Y value of the center of each hot spot is next determined. The first approximate location of each stored response is next compared to the location of the proximate hot spots centers to determine the closest one, and the X, Y value of the closest center is assigned as the second approximate location of the stored response in place of the first approximate location. All of the responses assigned to a particular second approximate location are clustered together and analyzed by frequency distribution and statistical analysis. Outlying and non representative signal patterns such as those generated by Compton interaction within the crystal and the occasional deviant signal resulting from the statistical nature of the interactions may now be discarded. Characteristic signal patterns most likely to occur when source is centered over a collimator hole are thereby determined from radiation responses of these clustered second approximate locations along with ranges of deviation therefrom as the pattern becomes less probable or as the result of interactions in the crystal removed from the center of the hole. This enables software to increase resolution at the expense of sensitivity by rejecting more peripheral events when required. Each second approximate location is now matched to and replaced by an X, Y value stored in memory representing the true location of the collimator hole through which the radiation passed in generating those patterns. Second approximate locations are readily matched to true locations by simple computer processes because they will be in the same sequence but displaced by the non uniform physical processes which distort the images of today's cameras.

Figure 2:
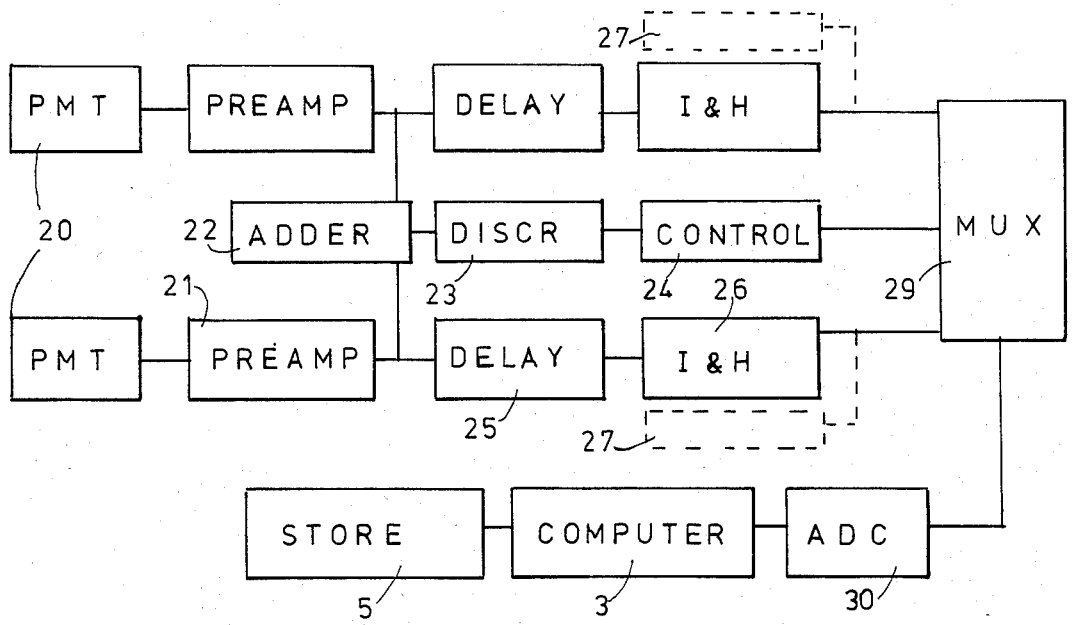
FIG. 2 shows a signal processing system.

Because this pattern matching process overcomes non uniformity distortions which degrade other positioning methods, non uniformities which improve system performance can be used to advantage by the present invention. The shaped light pipe 12 may also form the transparent window 11 of the crystal and have a total thickness less than conventional cameras which rely upon a thick light pipe to smooth response. The reflecting surfaces 17 of the crystal and light pipe may be of a specular nature applied directly to the surfaces for greater directionality of light than the diffusing and smoothing white powder reflectors of prior art. The PMT array may be rectangular rather than the more closely packed hexagonal array of prior art. The shaped face 19 of light pipe 12 may take the form of rectangularly packed truncated cones whose apices have been cut to an area matching the photocathode area of the PMT's. This structure allows more light to be directed to proximal photocathodes to increase positioning information. The inherently uniformity correcting nature of the pattern matching process allows these means of increasing positioning signal information. FIG. 2 shows an embodiment of a signal processor of the invention. Each PMT 20 is connected via preamplifier 21 to two pathways. In a first path, adder 22 adds all the pulses and feeds the sum pulse to discriminator 23 which actuates control switch 24 which enables multiplexor 29 only when the sum pulse exceeds a predetermined level set in the discriminator. In a second signal path, each signal is delayed in delay 25 long enough for discriminator 23 to perform its function on the same pulse. The signal then passes to an integrate and hold 26. All the integrate and holds are held at zero by control switch 24 via multiplexor 29 except when an acceptable sum pulse actuates discriminator 23. The held pulses are then digitized and processed by multiplexor 29 and analog to digital converter 30 under operation of control 24. Accessory integrate and hold 27 may be switched in serially to buffer the input and thereby increase the system response rate. The fraction of the decaying light pulse in the crystal used for signal is controllable by the duration of the enabling of integrate and hold 26 by control 24 to trade between resolution and response rate. Computer 3 and storage 5 process the digital data.

Figure 3:
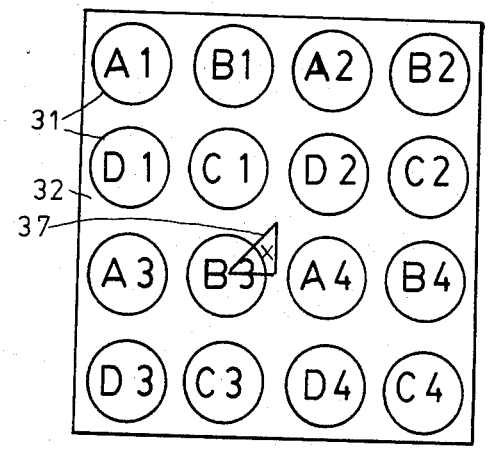
FIG. 3 shows the signals on a square array of photomultiplier tubes.
Figure 4:
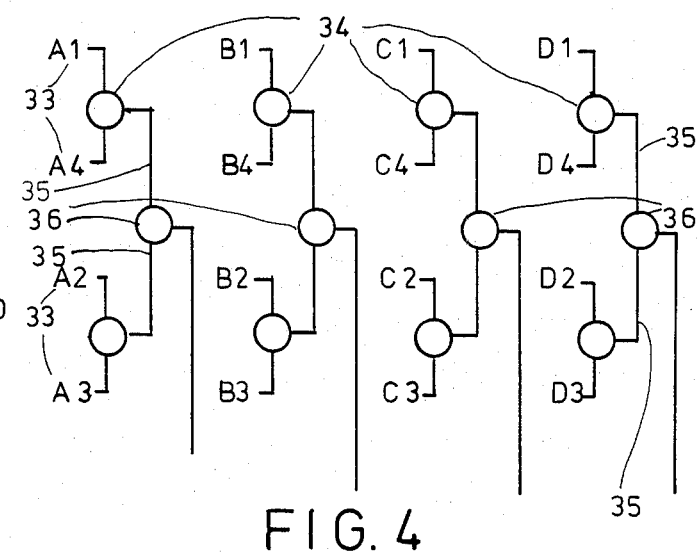
FIG. 4 shows a sorting and ordering process.

The data processing task may be greatly reduced and accelerated by sorting and ordering the PMT signals in the pattern so as to firstly discard the smaller signals which contribute to positioning more noise than signal, and to secondly arrange the remaining signals in descending order of amplitude. These processes may be performed in analog or digital form or a combination thereof. FIG. 3 shows a square array of PMT's 31 positioned against a crystal 32. Individual signals generated by the PMT's from a scintillation are indicated by the numbered letters within the circles. FIG. 4 shows how all 16 of the signals 33 are compared simultaneously in a first set of comparators 34 in a first step to discard the 8 weakest signals. The eight remaining signals 35 are compared in a second set of comparators 36 to select the four strongest signals. The four strongest signals now remaining are rearranged by another set of comparators into a descending order of amplitude. The binary switch position of each comparator at the conclusion of the comparison process is fed to the computer to indicate which signals were selected and their final order. For example, in FIG. 3, a scintillation occurring at X generates PMT signals which are sorted and ordered by the comparator process of FIG. 4 resulting in the descending order of selected signals B3/A4/C1/D4. This order will only occur in the triangular area 37. Only the signal patterns in that portion of the calibration memory defined by this order need be searched when an unknown pattern is to be matched. And each pattern is only four signals wide instead of sixteen. The number of calibration patterns which need be searched can be further reduced by selecting only those whose B3 value is close to the B3 value of the unknown pattern. The calibration patterns are arranged in order in memory so that the order and a certain range of values of the highest signal, for example, constitutes an address in memory. Not shown is another stage which adds all the signals together for total pulse height information. Multivariate pattern recognition programs such as Arthur (Research/Development Feb. 1978, Page 52) may be used to make the final decision on which is the closest matching pattern and whether it is acceptably close.

When the sorting and ordering process is applied to the calibration signals it reduces the data processing task here as well. Having clustered all of the patterns probably representing a source over a collimator hole, mathematical processes are applied to select a pattern most representative of a photon impinging the crystal directly beneath the center of that hole. First consider the exceptional case wherein the collimator hole and scintillating crystal are directly over the effective center of a PMT photocathode. The signal from that PMT will be maximum and any deviation from that location will yield a lower signal. When analysis of a signal pattern reveals that one PMT signal is at the maximum value found anywhere, then that signal value may be taken as the central value. In other much more common situations, the signal will remain relatively unchanged as the event moves tangentially to the effective photocathode center and will increase or decrease as the event moves radially toward or away from the effective photocathode center. A frequency distribution analysis of the signals finds a signal value intermediate the high and low values to represent the most likely value of the signal at the center of the hole. This is done for each PMT remaining in the pattern after sorting and ordering. Measured deviations from that central value may also be stored so that acceptability limits may be programmed and changed in software to trade off between resolution and sensitivity as required by different clinical situations. Also stored in calibration memory may be total pulse height data and field uniformity data.

The following is an example of a mathematical process which may be applied to determine a pattern most representative of a photon impinging the crystal directly beneath the center of a collimator hole and to derive a measure of central tendency to provide criteria for rejection of photon events occurring at the periphery of a collimator hole for improvement of image resolution. After the calibration process has clustered together a group of PMT signal patterns most probably from photons passing through a common collimator hole, the amplitude of all of the signals in the cluster from a single PMT are used to calculate a median value and a measure of the deviation from the median such as the root mean square of the deviation from the median. This process is performed for each PMT in the pattern. Then the set of median PMT values is taken as the most representative signal pattern against which the unknown patterns are compared and the deviations are used as criteria of closeness of fit for accepting or discarding unknown radiation response data.

Figure 5:
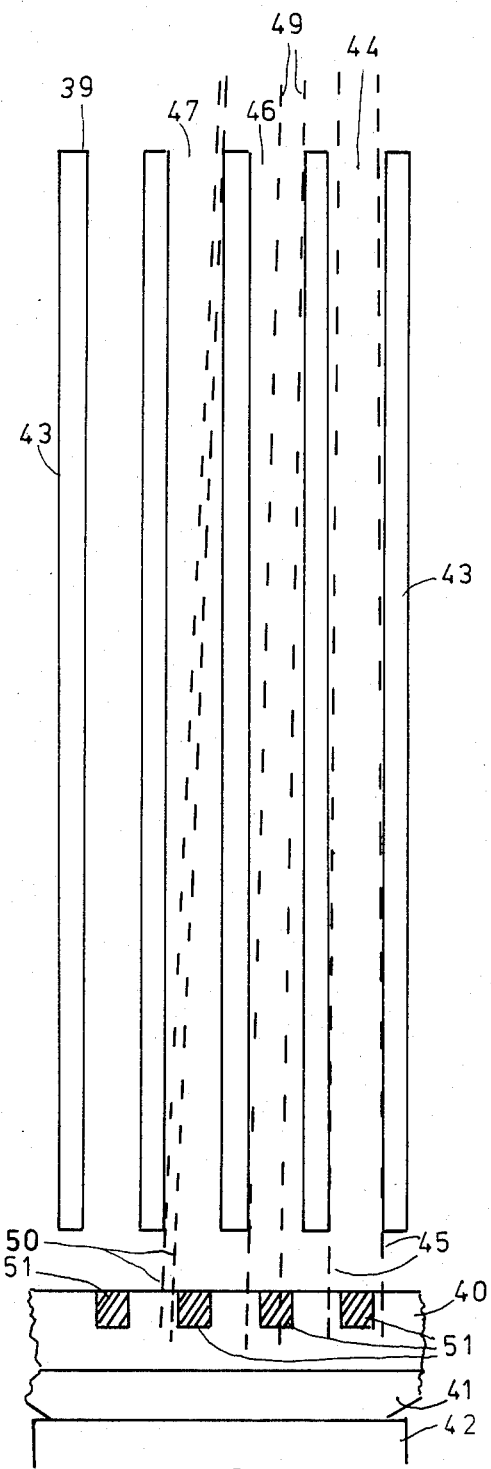
FIG. 5 shows a portion of detector with collimator.

FIG. 5 shows a portion of a detector with a parallel hole collimator 39, having lead septa 43, holes 44, 46, 47 and crystal 40 with window 41 and PMT 42. Photons 45 from a distant source centered over hole 44 strike the crystal under that hole as shown, if there is no septal penetration. Photons 49 from the same source pass through adjacent hole 46 to strike the crystal. Scintillations here falsely locate the source. Photons 50 from the same source pass through twice removed hole 47 to strike the crystal and falsely locate the source by a greater error. When holes are tightly packed in a hexagonal array, every hole 44 is surrounded by six immediately adjacent holes 46, and twelve holes 47 which are spaced one more hole away through which the false photons may pass. Septal penetration further increases the proportion of false rays striking the crystal. Limiting acceptance to patterns generated in the shaded areas 51 of the crystal by methods of the present invention eliminates more of the false photons than the true photons, thereby improving system resolution at a distance.

The above described data processing may be performed in analog mode, in digital mode or combinations thereof. The above data processing steps may be in hardware, in firmware or in software or in combinations thereof.

Figure 6:
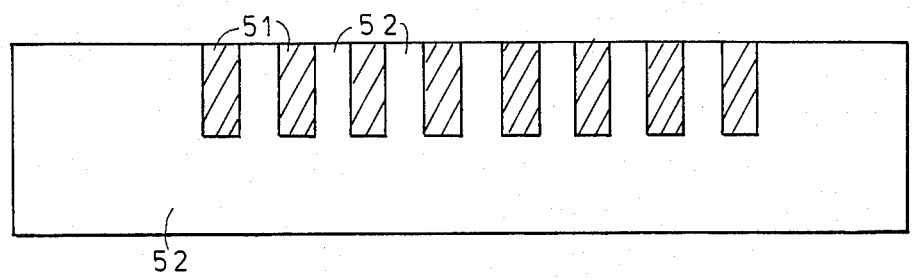
FIG. 6 shows a detector crystal with limited regions of responsiveness.

In another embodiment of the invention, the detector crystal is not homogeneous. The shaded areas 51 under the collimator holes of the crystal 40 of FIG. 5 are composed of a material responsive to the radiation while the unshaded areas of the crystal are unresponsive to the radiation. A detector of this type, shown in section in FIG. 6 may be fabricated, for example, by assembling a plurality of individual shaped pieces of crystal material of sodium iodide, NaI, and thallium activated sodium iodide, NaI(Tl). Both forms of crystal have common optical properties which facilitates light distribution to the photodetectors, but only the thallium form responds to the radiation by scintillating. In this embodiment, the shaded areas 51 of FIG. 6 would be composed of NaI(Tl) and the unshaded areas 52 would be composed of radiation unresponsive NaI. Alternatively, one may fashion a disc of NaI with holes into which NaI(Tl) formed elements are inserted. Alternatively, one may fashion a disc of NaI and implant thallium into regions by a masked ion implantation process.

Figure 7:
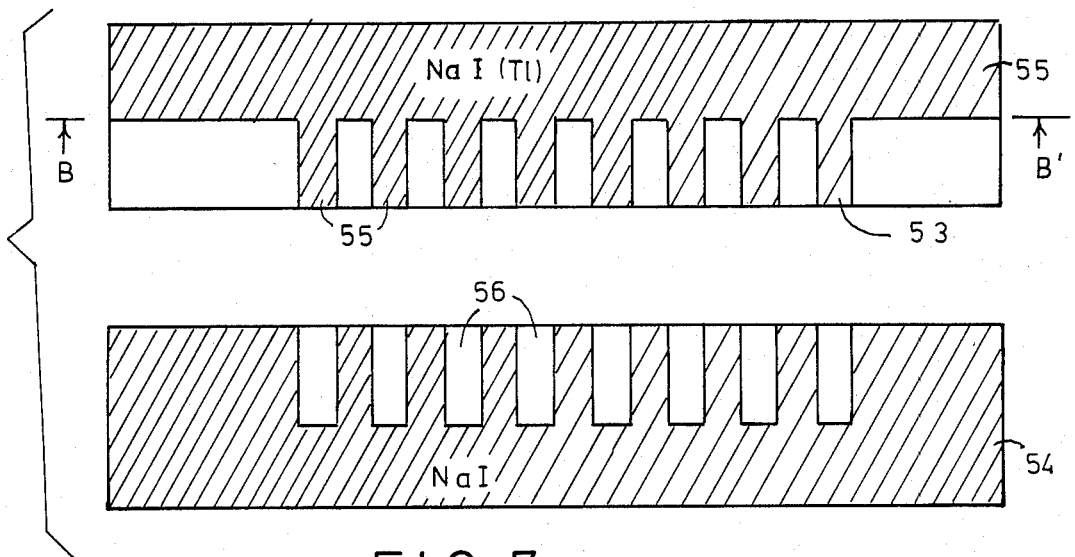
FIG. 7 shows fabrication process of the crystal of FIG. 6.

Forging and extruding techniques can now provide a polycrystalline material with retention of the radiation properties of single crystal materials. These techniques may be employed to produce the crystal of FIG. 6. FIG. 7 shows in section two formed crystals, an upper crystal 53 of NaI(Tl) and a lower crystal 54 of NaI which might be forged by the polycrystalline technique. The projections 55 and holes 56 may be cylindrical with a slight taper for ease of manufacture or hexagonal in section for maximum efficiency. The two pieces are fitted together and fused by heat and pressure. The upper, connecting portion 55 of disc 53 is then removed at plane B—B'. An additional advantage of a crystal of this type is that the NaI without thallium provides most efficient side and base radiation shielding. Alternatively, the heterogeneous crystal may be formed from an assembly of extruded shapes. For example, a process of coextrusion may be employed to extrude elongate hexagonal rods of active NaI(Tl) encased in a hexagonal shell of inactive NaI. These hexagonal shapes may be packed and fused together to form the crystal. These embodiments of the invention employing a heterogeneous crystal detector provide more precise rejection of off-axis (periphery of collimator hole) radiation for resolution enhancement and accomplishes this task without the expense and delay of sophisticated computer processing. Its disadvantages include the added complexity and cost of the special crystal and its fixed nature. Collimator hole positioning must match the crystal. Adjustments of resolution and sensitivity cannot be made in computer software. These constraints limit the versatility of this embodiment. The crystal geometry may be optimized for a particular application and used sub-optimally for other applications.

In another embodiment of the invention, calibration data of generally acceptable, on-axis radiation is collected while the collimator is closely applied to the surface of the scintillator, and calibration data of both on-axis and off-axis radiation is collected when the collimator is positioned away from the surface of the scintillator. The difference between the two sets of data represents radiation response data which are to be rejected by data processing to improve image quality. In another embodiment of the invention, calibration data of generally acceptable, on-axis radiation is collected with a point source of radiation centered over each collimator hole at the surface of the collimator. Calibration data of both on-axis and off-axis radiation is collected with either a uniform planar source of radiation over the collimator or with a source of radiation over each collimator hole, but displaced away from the surface of the collimator. The difference between the two sets of data represents radiation response data which are to be rejected by data processing to improve image quality.

What is claimed is:

1. A system for imaging a distributed radiation emitting source with scintillation means in the path of said radiation to provide light indications of individual radiation events, having a plurality of photodetector means viewing said light indications in said scintillation means, and data processing means connected to signal processing means, said signal processing means connected in turn to said photodetector means for processing photodetector signals in response to said light indications to provide radiation response data indicative of the energy and location of each radiation event, and means responsive to said radiation response data for displaying a representation of the correct location of the source of the radiation, and collimator means composed of radiation opaque material having holes therethrough, said collimator means interposed between said radiation emitting source and said scintillation means to remove some non-parallel (off-axis) radiation by shielding so that radiation striking said scintillation means will approximate a planar projection of the distribution of radiation at the source, wherein the improvement comprises: rejecting means included in said data processing means for rejecting, from the image in said displaying means, radiation response data obtained from radiation striking said scintillation means at certain regions of said scintillation means which bear a particular geometric relationship to said holes in said collimator means, said rejecting enhancing image quality by discarding certain off-axis radiation which degrades image resolution and passes through said collimator means when said source is not at the surface of said collimator means, wherein said rejecting means further includes means for comparing unknown response data from a source in an unknown location with a plurality of stored calibration response data generated from calibration sources in known locations to find closest matching calibration response data; said rejecting means rejects said unknown response data when results of said comparison indicate that unknown response data deviates excessively from said closest matching calibration response data; and calibration means for providing said stored calibration response data from calibration sources in known locations, said calibration response data including representative response data for said comparison and an index of deviation therefrom generated by a plurality of radiations passing through each hole in said collimator means, and said known source locations corresponding to locations of said holes in said collimator means.

2. The system of claim 1, wherein said certain regions of said scintillation means includes those regions of said scintillation means which are not beneath said holes in said collimator means.

3. The system of claim 1, wherein said certain regions of said scintillation means include those regions of scintillation means which correspond to projections of the periphery of said holes of said collimator means onto said scintillation means.

4. The system of claim 1, said data processing means further including means for comparing and sorting individual photodetector response signals to discard those photodetector signals of relatively low amplitude to simplify the subsequent comparison process.

5. The system of claim 1, said signal processing means including a first decoding means for converting a plurality of photodetector signals from a radiation response into a pair of signals representing approximately a two dimensional location of said radiation event, said pair of signals then comprise said response data for simplifying said comparison.

6. The system of claim 1, said data processing means further including ordering means for arranging the response signals from said photodetector means according to amplitude to facilitate data processing.

7. The system of claim 1, wherein said calibration means includes calibration source moving means for moving said source over each of said holes in said collimator means in sequence.

8. The system of claim 1, wherein said calibration means further includes means for processing individual radiation responses in said scintillation means from radiation emitted from calibration source means so disposed as to irradiate said scintillation means through a plurality of holes in said collimator means simultaneously; means for determining the location in the calibration source of each event including a first approximate locating means for recording the first approximate two dimensional location of each response on the basis of the summations of the relative position of each photodetector means and the signal thereon; a second approximate locating means for recording the second approximate location of each calibration response data on the basis of the greatest proximity of the first approximate location to one of a plurality of second approximate locations which are determined by the locations of centers of concentration of responses generated when a plurality of first approximate locations of responses to said calibration radiation source are surveyed, and means for replacing said second approximate location data assigned to said calibration response with a true location of a particular hole in said collimator means.

9. The system of claim 8, wherein said calibration means includes web means supporting a plurality of generally uniform spot sources of radiation emitting material in locations centered over said holes in said collimator means.

10. The system of claim 8, wherein said calibration means includes a generally uniform planar source of radiation emitting material so disposed as to simultaneously irradiate said scintillation means through a plurality of holes in said collimator means simultaneously.

11. The invention of claim 10 including moving means to move said planar source of radiation within its plane to average out any lack of uniformity of said source.

12. The invention of claim 1, wherein each radiation event which is not rejected is located in said displaying means at the location of said closest matching calibration response data.

13. A system for imaging a distributed radiation emitting source with scintillation means in the path of said radiation to provide light indications of individual radiation events, having a plurality of photodetector means viewing said light indications in said scintillation means, and data processing means connected to signal processing means, said signal processing means connected in turn to said photodetector means for processing photodetector signals in response to said light indications to provide radiation response data indicative of the energy and location of each radiation event, and means responsive to said radiation response data for displaying a representation of the correct location of the source of the radiation, and collimator means composed of radiation opaque material having holes therethrough, said collimator means interposed between said radiation emitting source and said scintillation means to remove some off-axis radiation by shielding so that radiation striking said scintillation means will approximate a planar projection of the distribution of radiation at the source, wherein the improvement comprises: rejecting means for rejecting from the image in said displaying means, radiation response data obtained from radiation striking said scintillation means at certain regions of said scintillation means at certain regions of said scintillation means which bear a particular geometric relationship to said holes in said collimator means, said rejecting enhancing image quality by discarding certain off-axis radiation which degrades image resolution and passes through said collimator means when said source is not at the surface of said collimator means, said rejection means including non-homogenous scintillation means composed of radiation unresponsive material at certain regions of said scintillation means which bear a particular geometric relationship to said holes in said collimator means to discard certain off-axis radiation from image formation and composed of radiation responsive material at those regions of said scintillation means centered beneath said collimator holes to thereby limit radiation responsiveness to on-axis radiation to enhance image resolution.

14. The system of claim 13, wherein said radiation unresponsive material at certain regions of said scintillation means is composed of crystalline sodium iodide and said radiation responsive material at the regions of said scintillation means is composed of crystalline sodium iodide activated with thallium.

15. The system of claim 13, wherein said scintillation means is fabricated from a mass of radiation unresponsive material having holes therein, said holes being filled with radiation responsive material.

16. The system of claim 13, wherein said scintillation means is fabricated from a mass of radiation unresponsive material by implantation of ions into those areas which are to be made radiation responsive.

17. The system of claim 13, wherein said scintillation means is assembled from a plurality of elongate members of radiation responsive material coated with radiation unresponsive material.

18. A method for adjustably enhancing the imaging resolution of a scintillation camera, the camera having data processing means for processing data from signal processing means responsive to radiation interactions in scintillation means for producing an image representing the distribution of radiation emitting materials in a body viewed by said scintillation means through multi-hole collimator means, said method comprising the steps of:
(a.) accumulating calibration data from radiation interactions in said scintillation means with known calibration radiation material in known locations;
(b.) processing said calibration data to identify interactions which occur in said scintillation means beneath each hole of said multi-hole collimator means;
(c.) further processing the calibration data for a collimator hole to distinguish between interactions which bear a particular geometric relationship to said collimator hole;
(d.) accumulating radiation data from a radiation emitting subject whose distribution is to be imaged;
(e.) processing the data generated by step (d.) to locate the collimator hole most likely associated with each interaction by comparison with the calibration data generated by step (b.);
(f.) distinguishing those interactions generated by step (d.) which bear a particular geometric relationship to a collimator hole by application of the calibration data generated in step (c.) for a particular collimator hole to each event processed in step (e.);
(g.) selectively discarding interactions found to bear a particular geometric relationship to a collimator hole by step (f.) when producing an image of the subject whose resolution is to be enhanced at the expense of sensitivity.

19. The method of claim 18, wherein those interactions which bear a generally peripheral relationship to a collimator hole are discarded and those which occur generally beneath the center of a collimator hole are retained for producing an image.

* * * * *